United States Patent
Pai

(10) Patent No.: US 10,397,298 B2
(45) Date of Patent: *Aug. 27, 2019

(54) METHOD AND SYSTEMS FOR OPTIMIZING BANDWIDTH UTILIZATION IN A MULTI-PARTICIPANT FULL MESH PEER-TO-PEER VIDEO SESSION

(71) Applicant: POLYCOM, INC., San Jose, CA (US)

(72) Inventor: Deep S. Pai, Pune (IN)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,261

(22) Filed: Aug. 31, 2017

(65) Prior Publication Data

US 2017/0366598 A1     Dec. 21, 2017

Related U.S. Application Data

(63) Continuation of application No. 15/176,254, filed on Jun. 8, 2016, now Pat. No. 9,756,107, which is a
(Continued)

(51) Int. Cl.
*H04N 7/14*          (2006.01)
*H04N 7/15*          (2006.01)
(Continued)

(52) U.S. Cl.
CPC ............ *H04L 65/80* (2013.01); *H04L 65/403* (2013.01); *H04L 65/4053* (2013.01);
(Continued)

(58) Field of Classification Search
CPC combination set(s) only.
See application file for complete search history.

(56) References Cited

U.S. PATENT DOCUMENTS 9,380,266 B2 *   6/2016   Pai ........................... H04N 7/15
9,756,107 B2 *   9/2017   Pai .......................... H04L 65/80
(Continued)

FOREIGN PATENT DOCUMENTS

CN     101557495 A     10/2009
EP       1921825         5/2008
(Continued)

OTHER PUBLICATIONS

PCT Search report filed in co-pending PCT Application No. PCT/US15/23547 dated Jul. 10, 2015, 15 pages.
(Continued)

*Primary Examiner* — Phung-Hoang J Nguyen
(74) *Attorney, Agent, or Firm* — Blank Rome, LLP

(57) ABSTRACT

An endpoint optimizes bandwidth by initiating a peer-to-peer conference with a plurality of remote devices, generating a first quality list comprising a first device of the plurality of remote devices from which to receive a first data stream at a first quality level, transmit a request to the first device to receive the first data stream at the first quality level, determining that a second device of the plurality of remote devices is not a member of the first quality list, and in response to determining that the second device of the plurality of remote devices is not a member of the first quality list, transmitting a request to the second device to receive a second data stream at a second quality level.

20 Claims, 6 Drawing Sheets

Related U.S. Application Data continuation of application No. 14/674,587, filed on Mar. 31, 2015, now Pat. No. 9,380,266.

(60) Provisional application No. 61/973,055, filed on Mar. 31, 2014.

(51) Int. Cl.
    *H04L 29/06* (2006.01)
    *H04L 29/08* (2006.01)

(52) U.S. Cl.
    CPC .......... *H04L 65/602* (2013.01); *H04L 65/608* (2013.01); *H04L 67/104* (2013.01); *H04N 7/147* (2013.01); *H04N 7/15* (2013.01)

(56) References Cited

U.S. PATENT DOCUMENTS

| | | |
|---|---|---|
| 2002/0122429 A1 | 9/2002 | Griggs |
| 2004/0125776 A1 | 7/2004 | Haugli et al. |
| 2006/0066717 A1 | 3/2006 | Miceli |
| 2007/0107019 A1 | 5/2007 | Romano et al. |
| 2009/0222572 A1 | 9/2009 | Fujihara |
| 2011/0044184 A1 | 2/2011 | Balasaygun et al. |
| 2011/0310216 A1* | 12/2011 | Lee .......... H04N 7/15 348/14.08 |
| 2012/0081506 A1* | 4/2012 | Marvit ........ H04N 7/15 348/14.12 |
| 2012/0089682 A1 | 4/2012 | Wu et al. |
| 2013/0003720 A1 | 1/2013 | Tasker |
| 2013/0332738 A1 | 12/2013 | Setton et al. |
| 2014/0071223 A1* | 3/2014 | Chatterjee ........ H04L 65/403 348/14.08 |
| 2015/0271447 A1* | 9/2015 | Glass ............ H04N 7/152 348/14.09 |
| 2016/0021149 A1* | 1/2016 | Maistri .......... H04L 65/403 348/14.08 |

FOREIGN PATENT DOCUMENTS

| | | |
|---|---|---|
| WO | 0235844 A2 | 5/2002 |
| WO | 2008027724 A1 | 3/2008 |

OTHER PUBLICATIONS

EPO Search Report issued in copending EPO Application No. 15773501.0 dated Oct. 10, 2017, 9 pages.

\* cited by examiner

METHOD AND SYSTEMS FOR OPTIMIZING BANDWIDTH UTILIZATION IN A MULTI-PARTICIPANT FULL MESH PEER-TO-PEER VIDEO SESSION

CROSS-REFERENCE TO RELATED APPLICATIONS

This application is a continuation of U.S. patent application Ser. No. 15/176,254, filed Jun. 8, 2016, which claims the benefit of U.S. application Ser. No. 14/674,587 filed Mar. 31, 2015 entitled "METHOD AND SYSTEMS FOR OPTIMIZING BANDWIDTH UTILIZATION IN A MULTI-PARTICIPANT FULL MESH PEER-TO-PEER VIDEO SESSION," which claims benefit to U.S. Provisional Application No. 61/973,055 filed Mar. 31, 2014 entitled "METHOD AND SYSTEMS FOR OPTIMIZING BANDWIDTH UTILIZATION IN A MULTI-PARTICIPANT FULL MESH PEER-TO-PEER VIDEO SESSION," both of which are expressly incorporated herein in its entirety by reference.

BACKGROUND OF THE INVENTION

The present disclosure relates generally to videoconferencing systems, and more particularly, to a system for optimizing bandwidth utilization in a multi-participant full mesh peer-to-peer video session.

A full mesh peer-to-peer video conference is achieved by setting up independent audio/video real-time transport protocol ("RTP") streams between each participant of the conference such that each participant transmits one audio, video, and possibly content stream to each other participant and receives the same from each other participant, as shown in FIG. 2. The main advantage of a full mesh conference by way of comparison to the more traditional centralized bridge conference method (FIG. 1) is the lower latency of media and the elimination of bottlenecks in the form of centralized media servers. Setting up individual streams with each participant also allows the video conferencing clients the capability to independently compose the video, or to select which participant(s) it wants to send/receive the video. The main disadvantage of the full mesh approach is that a potentially larger amount of bandwidth is required to set up video streams to send and received video from every participant in the conference. The full-mesh approach limits the size of a given conference to around 3-4 participants depending on available bandwidth to clients.

SUMMARY OF THE INVENTION

The disclosure is directed to a method, system, and computer readable medium for optimizing bandwidth in a mesh system. The method includes initiating, at a local mesh conferencing unit, a peer-to-peer conference with a plurality of remote devices. The method also includes generating a first quality list comprising a first device of the plurality of remote devices from which to receive a first data stream at a first quality level. The method also includes transmitting a request to the first device to receive the first data stream at the first quality level. The method also includes determining that a second device of the plurality of remote devices is not a member of the first quality list. The method also includes, in response to determining that the second device of the plurality of remote devices is not a member of the first quality list, transmitting a request to the second device to receive a second data stream at a second quality level.

BRIEF DESCRIPTION OF THE DRAWINGS

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION

In embodiments according to the present invention, participants in a full mesh peer-to-peer video session maintain one or more lists that each indicate a preferred quality level at which to receive data streams from other devices in the session. The local device generates one or more lists of other devices in the session indicating a preferred quality, sends a request to the various remote devices to receive an associated data stream indicated by the list on which each remote device appears, or a default remote device. Because data streams at a high quality level require more bandwidth than data streams at a lower quality level, a local device can select a subset of the total number of devices in the full mesh peer-to-peer video session from which to receive data streams, such as video streams, at a high quality level. As a result, the bandwidth for data transmitted to the local device is optimized. The quality lists are maintained at each participant device, and the lists may vary between participant devices.

Figure 1:
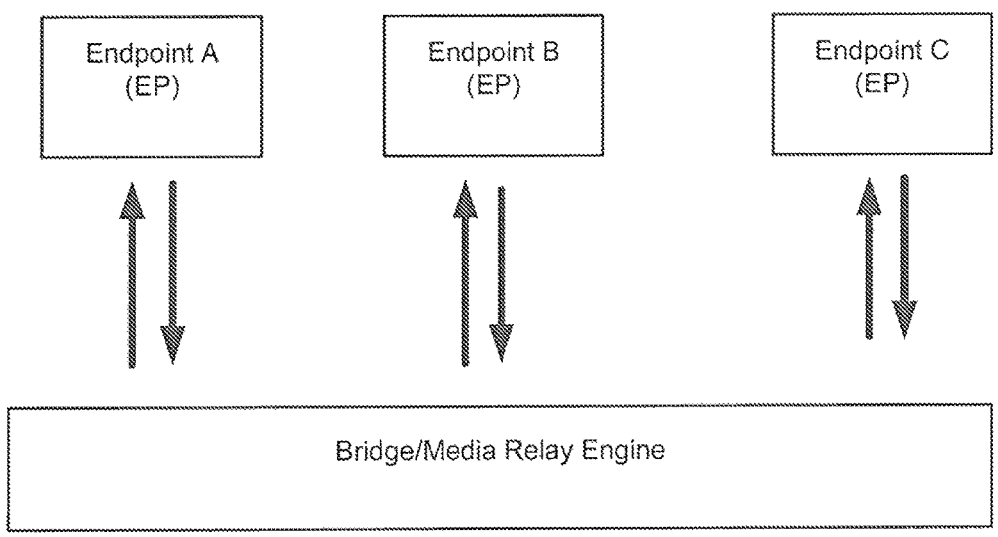
FIG. 1 illustrates a conferencing system according to the prior art using a centralized entity.
Figure 2:
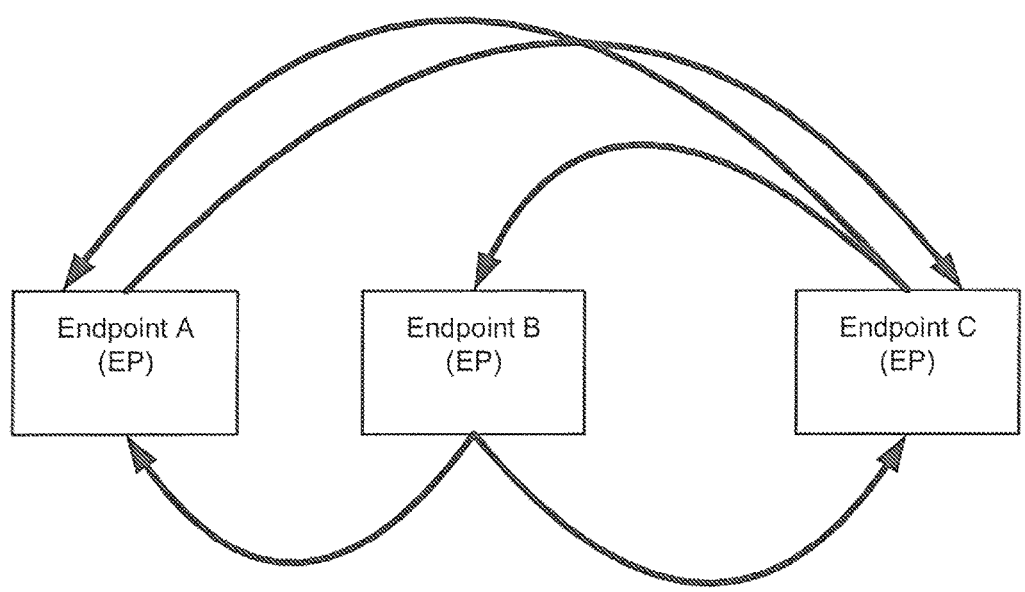
FIG. 2 illustrates a conferencing system according to the prior art using peer-to-peer communications.
Figure 3:
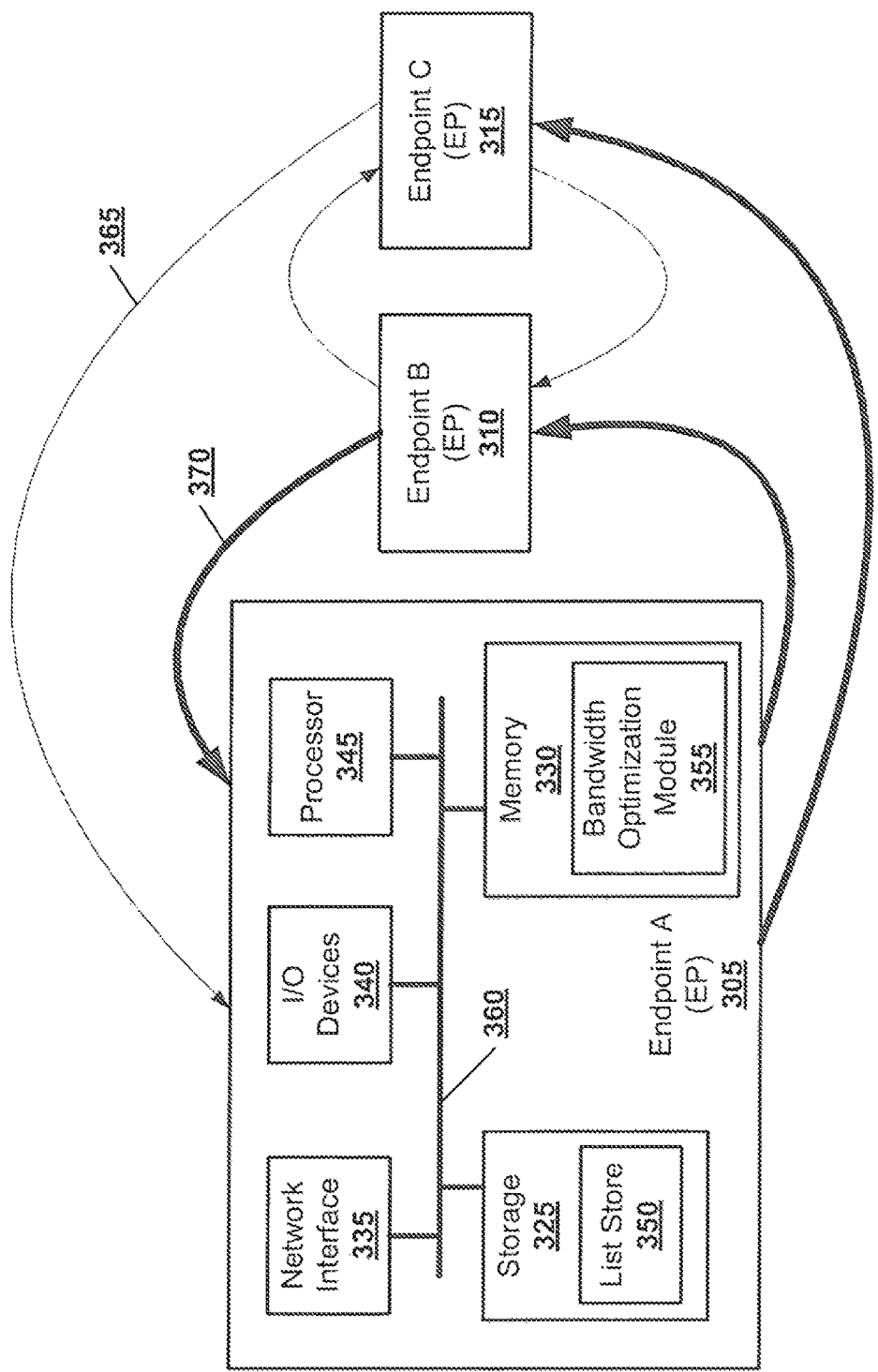
FIG. 3 illustrates an embodiment of a conferencing system according to the present invention.

FIG. 3 depicts an example full mesh peer-to-peer system, including various endpoints ("EPs"). Specifically, the example full mesh peer-to-peer system includes EP A 305, EP B 310, and EP C 315. For purposes of this disclosure, each endpoint is a mesh conferencing unit, and is a conferencing device that allows for multiple endpoints to be communicably connected across a peer-to-peer network. EP A 305 is depicted in greater detail, although the contents of EP A 305 could also be found, in whole or in part in EP B 310 and EP C 315. EP A 305, EP B 310, and EP C 315 are part of a mesh conferencing system ("MCS"). In an MCS, there is no central entity for handling the media streams. Instead, in an MCS a Roster List Server ("RLS") can be used as the central signaling entity and clients can send and receive the media directly from each other. In an example of an MCS, a client can use a WebRTC application program interface ("API"). The WebRTC was drafted by the World-Wide-Web consortium (W3C) for facilitating browser-to-browser real-time communication (P2P) of audio, video, and data sharing. A common WebRTC may use a VP8 codec for video and an OPUS codec for audio. VP8 is a video compression format owned by Google Inc. OPUS is a lossy audio codec developed by the Internet Engineering Task Force (IETF). The WebRTC and the compression format VP8 are currently supported by browser applications such as, but not limited to, Google CHROME® (CHROME is a registered trademark of Google Inc.); Mozilla FIREFOX® (FIREFOX is a registered trademark of Mozilla Foundation); OPERA® (OPERA is a registered trademark of Opera Software ASA). Some browsers may need a plug-in in order to use WebRTC and the VP8 codec. Other MCS may use other Web clients and other compression standards in order to deliver mesh conferencing services.

EP A 305 is shown in greater detail, and the contents of EP A 305 may also be included in one or more of EP B 310 and EP C 315. As depicted, EP A 305 includes various components connected across a bus 360. The various components include a processor 345, which controls the operation of the various components of EP A 305. Processor 345 can be a microprocessor, microcontroller, a field programmable gate array (FPGA), an application specific integrated circuit (ASIC), or a combination thereof. Processor 345 can be coupled to a memory 330, which can be volatile (e.g., RAM) or non-volatile (e.g., ROM, FLASH, hard-disk drive, etc.). In one or more embodiments, memory 330 includes bandwidth optimization module 355, which optimizes bandwidth by throttling the quality of incoming data streams, such as video streams, using methods which will be discussed in further detail below.

Storage 325 may also store all or portion of the software and data associated with EP A 305. In one or more embodiments, storage 325 includes non-volatile (e.g., ROM, FLASH, hard-disk drive, etc.), and stores data related to the bandwidth optimization module 355. For example, storage 325 may include a list store 350. In one or more embodiments, list store 350 includes one or more quality lists which determine at what quality level EP A 305 should request to receive data streams, such as video data streams, from remote devices, such as EP B 310 and EP C 315. For example, if an endpoint is mobile device, the associated participant may have only a Low Quality list of size 1. In one or more embodiments, list store 350 includes at least a high quality list, which indicates endpoints from which EP A 305 should receive data streams at a high quality. Said another way, the high quality list indicates remove devices whose data stream quality should be prioritized when optimizing bandwidth. In one or more embodiments, list store 350 may include a single list which identifies devices from which to request data streams at a high quality. Alternatively, list store 350 may include numerous lists, each associated with a different quality level.

The example EP A 305 includes additional components, such as a network interface 335, which may allow EP A 305 to communicably connect to remote devices, such as EP B 310 and EP C 315. That is, in one or more embodiments, EP A 305, EP B 310, and EP C 315 are connected across a network, such as a packet switched network, a circuit switched network, an IP network, or any combination thereof. The multimedia communication over the network can be based on protocols such as, but not limited to, H.320, H.323, SIP, HTTP, HTML5 (e.g. Web Sockets, REST), SDP, and may use media compression standards such as, but not limited to, H.263, H.264, VP8, G.711, G.719, and Opus. HTTP stands for Hypertext Transfer Protocol and HTML stands for Hypertext Markup Language.

EP A 305 also includes various I/O devices 340 that allow a user to interact with EP A 305. The various I/O devices 340 may include, for example, one or more of a speaker, a microphone, a camera, and a display that allow a user to send and receive data streams. Thus, EP A 305 may generate data streams to transmit to EP B 310 and EP C 315 by receiving audio or video signals through the various I/O devices 340. EP A 305 may also present received data signals to a user using the various I/O devices 340. Further, in one or more embodiments, I/O devices 340 may also include devices that allow a user of EP A 305 to manage the bandwidth optimization module and/or quality lists in list store 350. For example, I/O devices 340 may also include a keyboard and a mouse such that a user may interact with a user interface displayed on a display device to manage quality lists for the device.

In one or more embodiments, the components of EP A 305 optimize the bandwidth of data signals received from remote devices using bandwidth optimization module 355, which may be stored in the form of software within EP A 305. Alternatively, bandwidth optimization module 355 may be accessed from a remote device across a network, such as the Internet. That is, the bandwidth optimization module 355 and the list store 350 may be stored locally in EP A 305 in either storage 325 or memory 330, or may be accessed remotely, such as through a website or other cloud storage or service, but are accessible to EP A 305.

In one or more embodiments, each of EP A 305, EP B 310, and EP C 315 sends and receives individual streams from every other participant in the video session. In order to optimize the bandwidth at each endpoint, the various endpoints may request to receive data streams from some remote devices at a high quality, and other data streams from remote devices at a lower quality. For example, video quality can be modified by either changing the bitrate, the size or the frame rate of the video, or a combination of all of these. In one or more embodiments, video quality may be modified while audio quality or other data stream quality remains consistent.

The various quality levels are depicted in FIG. 3 by a difference in line thickness between various endpoints. The stream quality is not expected to be symmetric, i.e., the participant may be receiving high quality stream from a participant but may be sending a low quality stream to that participant. For example, data stream 365 indicates that EP A 305 has requested to receive a data stream from EP C 315 at a lower quality than data stream 370 from EP B 310. In one or more embodiments, EP B 310 may be listed in a quality list in list store 350 that indicates data streams from EP B 370 should be requested at a high quality. Alternatively, or additionally, list store 350 may also include a low quality list that indicates that data stream 365 from EP C 315 should be requested at a low quality, thus requiring less bandwidth. As an example, list store 350 may include a list associated with a bandwidth of zero in a case where a user does not care to receive a video stream, for example, from one or more participants in a peer-to-peer conference. Because the quality lists are controlled individually by each endpoint, the quality of a data stream received by a particular endpoint is not necessarily reciprocated.

Bandwidth optimization module 355 may determine whether to add or remove a participant from a quality list based on a number of conditions before and during a peer-to-peer conference. Bandwidth optimization module 355 may request a modified video quality when a participant is added or removed from a particular quality list list using standard Session Description Protocol (SDP) offer/answer negotiation by specifying the correct video quality details in the SDP. Some of these conditions may be based on characteristics of the remote participant, such as identifying an active speaker at the endpoint, or determining that the audio stream from a particular endpoint has been inactive for a period of time. As another example, these conditions may be determined based on local characteristics, such as a screen size, available memory, processor speed, or available bandwidth. Further, as another example, the bandwidth optimization module 355 may provide a user interface to allow a user of the local endpoint to manual select which quality list remote endpoints belong. In one or more embodiments, the user interface may allow a user to manually assign remote devices to default lists or to assign remote devices to various quality lists on demand, for example, when the content of the conversation between users would be improved by a high quality video stream. Each participant can decide on the quality it is capable of sending and receiving and can signal that accordingly over SDP to its peer.

In one or more embodiments, bandwidth optimization module 355 may manage removing participants from a particular quality list based on a number of conditions. These conditions may include determining that a new participant has met conditions to be added to the list and the list already contains a maximum number of list members. The list may be associated with a maximum number of list members allowed based on a total available bandwidth, for example. Each endpoint may have multiple quality lists, each of different sizes based on different criteria, for example, one high quality list, one medium quality list, and one low quality list based on characteristics of the local device and other parameters, such as available bandwidth. The number of members allowed in each list may vary. For example, a particular device with a small bandwidth may only allow a single member in a high quality list, and many members in a medium or low quality list, whereas a device with a large bandwidth may allow multiple members in a high quality list. Thus, when a new member satisfies conditions to be added to a particular quality list that is already at a maximum capacity, a current member must be removed. In one or more embodiments, the removed member is added to another quality list that is associated with a lower quality level. In one or more embodiments, regardless of the modifications to the quality of stream managed by the bandwidth optimization module, the various endpoints may continue to receive audio streams from each endpoint at a high quality level.

Figure 4:
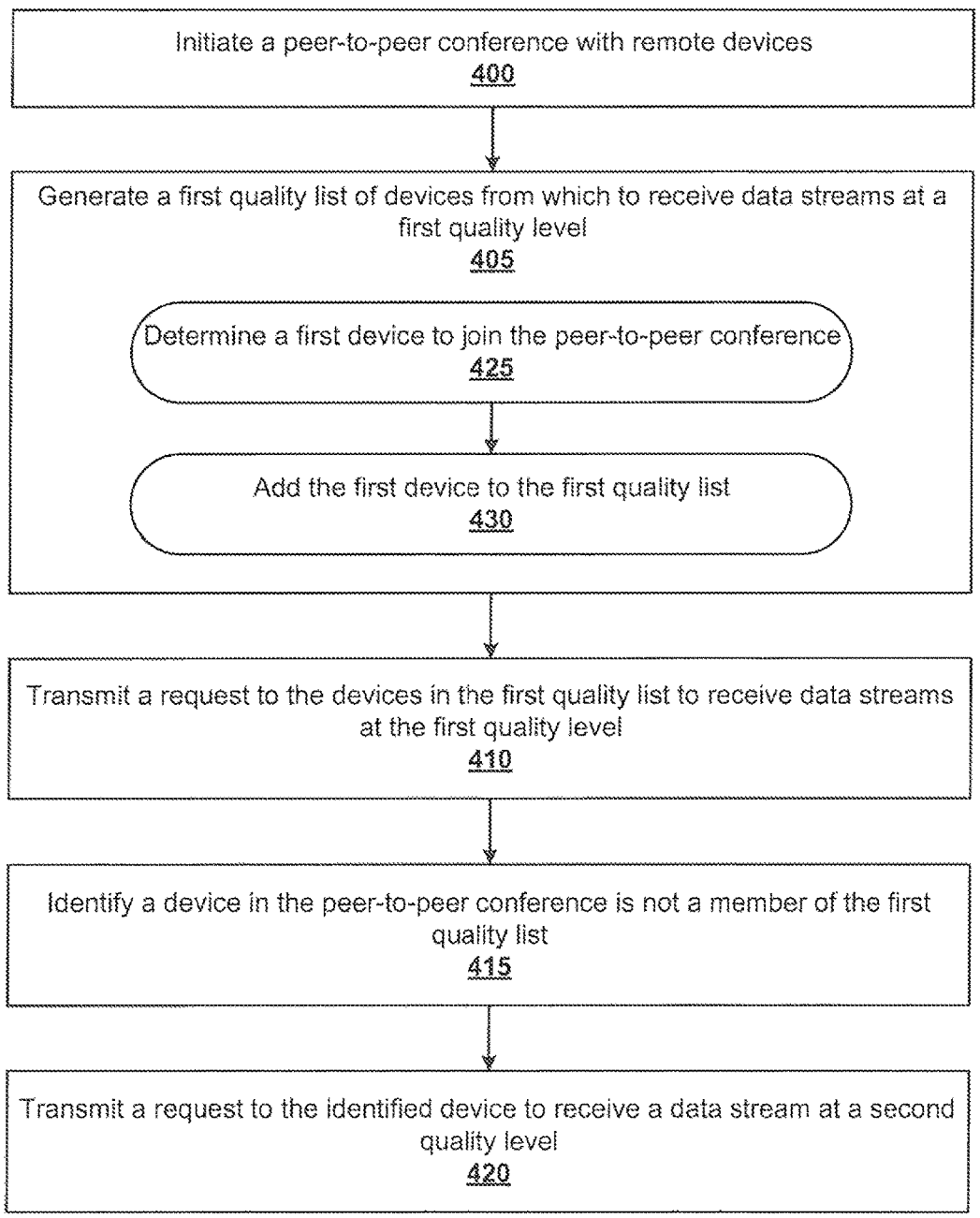
FIG. 4 illustrates a flow diagram of a method for optimizing bandwidth by creating a quality list, according to one or more embodiments.

FIG. 4 illustrates a flow diagram of an example method for optimizing bandwidth by creating a quality list, according to one or more embodiments. The flow diagram begins at 400, and bandwidth optimization module, such as bandwidth optimization module 355, initiates a peer-to-peer conference with a plurality of remote devices. Initiating the peer-to-peer conference may include sending a request to remote devices to join a peer-to-peer conference, or joining an ongoing peer-to-peer conference.

At 405, the bandwidth optimization module generates a first quality list including a first device of the plurality of remote devices from which to receive a first data stream at a first quality level. In one or more embodiments, generating a first quality list at 405 includes determining that the first device is the first to join the peer-to-peer conference (425). Determining that the first device is the first to join the peer-to-peer conference may include detecting the first device as a first active device in the peer-to-peer conference. In response to determining that the first device is the first to join the peer-to-peer conference, the flow diagram also includes adding the first device to the first quality list at 430. In one or more embodiments, the first quality list includes a list of remote devices from which to request a high quality data stream, such as a video stream.

The flow diagram continues at 410, the bandwidth optimization module transmits a request to the first device to receive the first data stream at the first quality level. The bandwidth optimization module may request the stream quality using standard Session Description Protocol (SDP) offer/answer negotiation by specifying the correct video quality details in the SDP. In one or more embodiments, the first device may not be honored if the first device does not have enough bandwidth to fulfill that request.

The flow diagram also includes the bandwidth optimization module identifying that a device in the peer-to-peer conference is not a member of the first quality list at 415. In one or more embodiments, identifying that a device is not a member of the first quality list may include determining that the device is a member of a second quality list, or is not a member of any quality list managed by the local device.

At 420, the bandwidth optimization module transmits a request to the device identified at 415 to receive a data stream at a second quality level. In one or more embodiments, bandwidth optimization module may determine that the identified device is included in a second quality list, where the second quality list indicates remote devices from which the bandwidth optimization module should request a data stream at a second quality level. Alternatively, the bandwidth optimization module may transmit a request to the identified device to receive a data stream at a quality level different than the quality level indicated by the first quality list, such as a quality level lower than the first quality level. In one or more embodiments, if the second quality level is not indicated by a second quality list, the second quality level may be a predetermined default quality level that is lower than the first quality level. Further, the bandwidth optimization module may add the identified device to a list associated with a bandwidth of zero, such that the device does not receive a data stream, such as a video stream, from the device. Again, the second device may not honor the request if the second device does not have enough bandwidth to fulfill that request.

Figure 5:
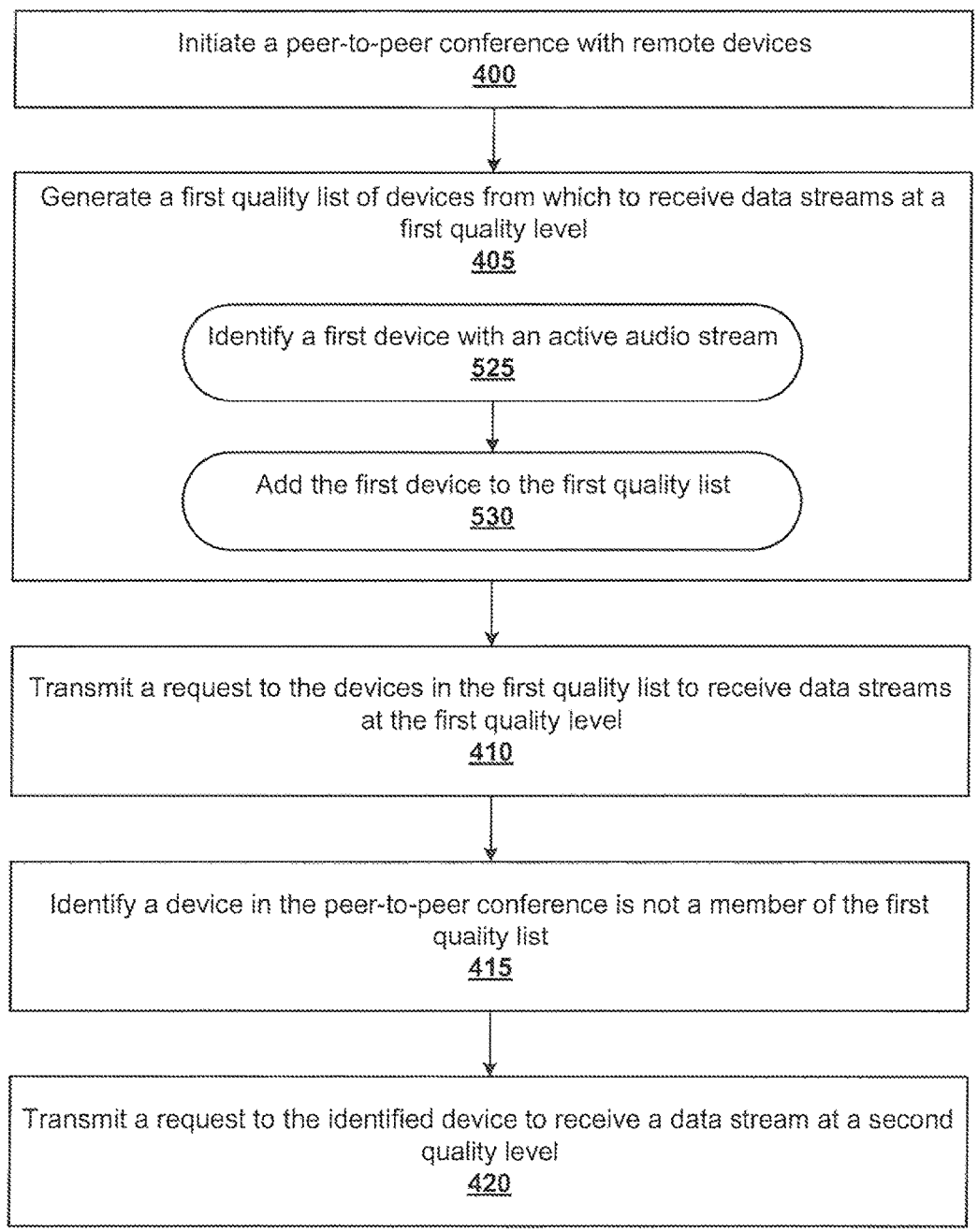
FIG. 5 illustrates a flow diagram of a method for optimizing bandwidth by creating a quality list, according to one or more embodiments.

FIG. 5 illustrates a flow diagram of an example method for optimizing bandwidth by creating a quality list, according to one or more embodiments. FIG. 5 includes some of the same actions as those depicted in FIG. 4. Specifically, FIG. 5 also depicts initiating a peer-to-peer conference with remote devices (400), generating a first quality list of devices from which to receive data streams at a first quality level (405), transmitting a request to the device in the first quality list to receive data streams at the first quality level (410), identifying a device in the peer-to-peer conference that is not a member of the first quality list (415), and transmitting a request to the identified device to receive a data stream at a second quality level (420).

FIG. 5 differs from FIG. 4 in that at 405, generating a first quality list of devices from which to receive data streams at a first quality level includes identifying a first device with an active audio stream (525), and adding the first device to the first quality list (530). For example, it may be preferable to have a higher quality view from a user that is currently speaking, and it may be less relevant to view a high quality view of other users.

Figure 6:
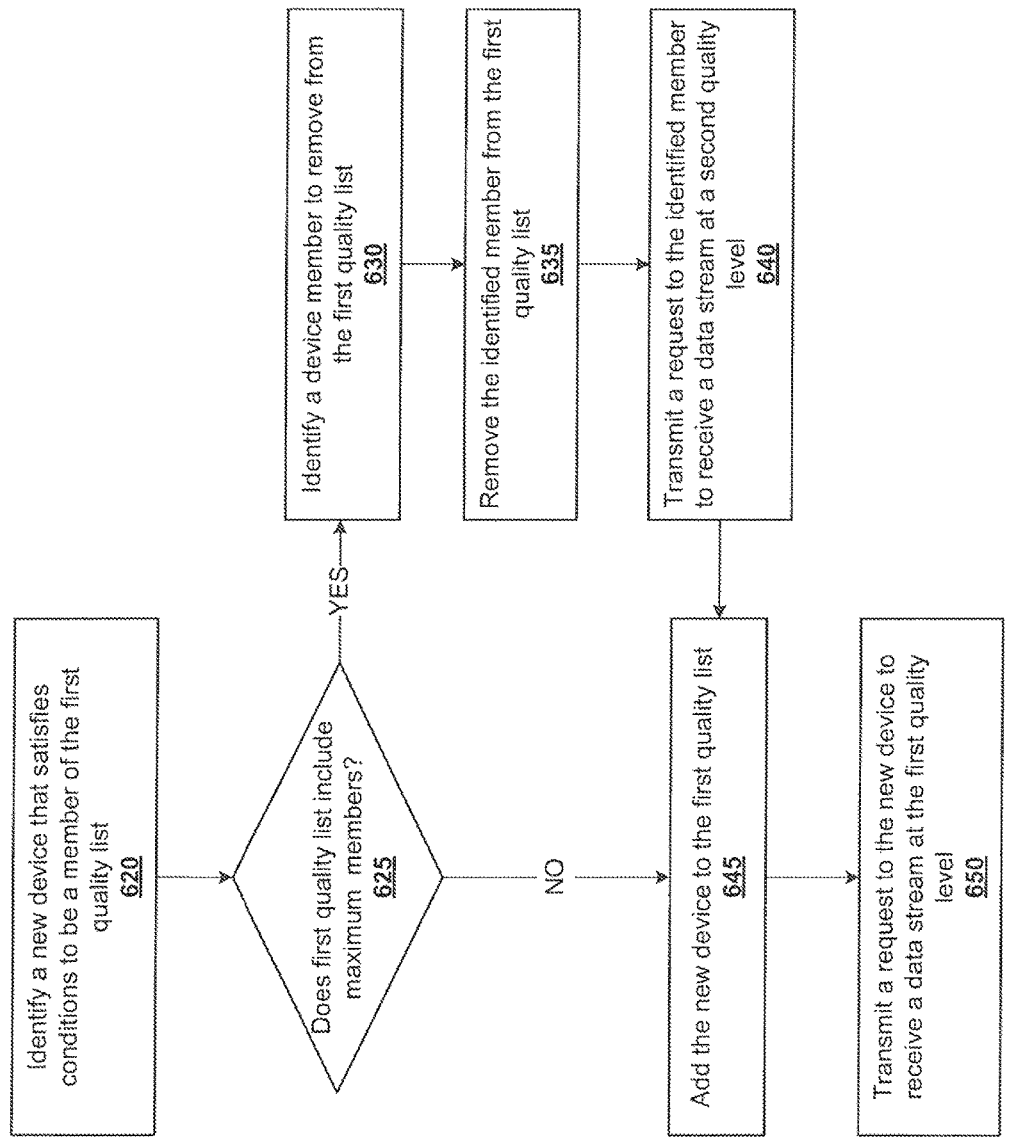
FIG. 6 illustrates a flow diagram of a method for optimizing bandwidth by modifying a quality list, according to one or more embodiments.

FIG. 6 illustrates a flow diagram of an example method for optimizing bandwidth by modifying a quality list, according to one or more embodiments. For example, list store 350 may include a predetermined number of slots for listing remote devices from which to request data streams at a high quality level. In one or more embodiments, the quality lists are dynamically modified during a peer-to-peer conference as the bandwidth optimization module monitors the incoming data streams to the local device.

At 620, the bandwidth optimization module identifies a new device that satisfies conditions to be a member of the first quality list. In one or more embodiments, the first quality list may be associated with certain characteristics. For example, bandwidth optimization module 355 may indicate that a device associated with a currently active audio stream should be included in a high quality list, or the bandwidth optimization module has predefined that a certain device should always be included in a high quality list. The bandwidth optimization module may determine that the device satisfies the conditions to join the list. In another embodiment, a user of the local mesh conferencing unit may manually indicate that a particular device should be added to a particular quality list, for example, through a user interface that allows a user of the local mesh conferencing unit to manage the members of one or more lists in list store 350.

At 625, the bandwidth optimization module determines whether the first quality list includes the maximum number of members allowed in the list. If so, then the flow diagram continues to 630, and the bandwidth optimization module identifies a device member to remove from the list. In one or more embodiments, the bandwidth optimization module may identify a member to remove from the list based on a variety of characteristics of the members of the list. For example, the device member identified for removal may be identified based on bandwidth usage, or because the identified member has been inactive for the longest period of time. As another example, each member of the list may be listed in a particular order of preference, and the least preferable member may be removed. Further, as another example, the bandwidth optimization module 355 may prompt a user of the bandwidth optimization module to manually select a member to remove from the first quality list through the use of a user interface.

The flow diagram continues at 635, and the identified member is removed from the first quality list. In one or more embodiments, removing the identified member from the first quality list may also include adding the member to a second quality list associated with a quality level lower than the quality level associated with the first quality list. In another embodiment, the bandwidth optimization module 355 may simply remove the identified member from the first list. The flow diagram continues at 640, and the bandwidth optimization module transmits a request to the identified member to receive a data stream at a second quality level. The second quality level may be a quality level associated with a second quality list if the device has been moved to the second quality list, or the second quality level may be any quality level that is different than the quality level associated with the first quality list.

Following 640, and additionally following 625 in the case that the first quality list does not include a maximum number of members, the flow diagram continues at 645, and the bandwidth optimization module 355 adds the new device to the first quality list. At 650, the bandwidth optimization module transmits a request to the new device to receive a data stream at quality level associated with the first quality list. In one or more embodiments, the first device may not be honored if the first device does not have enough bandwidth to fulfill that request.

In one or more embodiments, the advantage in this disclosure is that there is no requirement for media server involvement and hence the elimination of associated latency. The lists, criteria, and decision making are distributed to each participant and without reliance on centralized servers. In doing so, the bandwidth at each peer-to-peer conferencing unit is managed and optimized by the individual unit.

The above description is intended to be illustrative, and not restrictive. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter. For example, the above-described embodiments may be used in combination with each other. With respect to the flow diagrams identified above, it should be understood that any of the various actions could be performed in a different order or simultaneously with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for optimizing bandwidth in a mesh system, comprising:
   initiating, at a bandwidth optimization module, a peer-to-peer conference with a plurality of remote devices, wherein a first device is assigned to a first quality list and a second device is assigned to a second quality list, wherein the first quality list indicates a first quality level and wherein the second quality list indicates a second quality level;
   determining, during the peer-to-peer conference, that the second device satisfies conditions to be a member of the first quality list;
   determining that a maximum number of members of the first quality list has been reached;
   in response to determining that a maximum number of members of the first quality list has been reached, selecting the first device to be removed from the first quality list based on characteristics of the first device, wherein the members of the first quality list are listed in order of preference, and wherein the characteristics indicate that the first device is least preferable based on the order of preference of the first quality list;
   removing the first device from the first quality list;
   adding the second device to the first quality list; and
   transmitting a request to the second device to receive a data stream at the first quality level.

2. The method of claim 1, wherein the conditions to be a member of the first quality list comprise determining that the second device is associated with a currently active audio stream.

3. The method of claim 1, wherein the conditions to be a member of the first quality list comprise receiving user input directing the second device to be added to the first quality list.

4. The method of claim 1, wherein selecting the first device to be removed is further based on characteristics of additional members of the first quality list.

5. The method of claim 1, wherein the characteristics of the first device comprise a measure of inactivity of the first device.

6. The method of claim 1, wherein the characteristics of the first device comprise a comparable preference value of the first device among members of the first quality list.

7. The method of claim 1, wherein the characteristics of the first device comprise a received user input indicating that the first device should be removed from the first quality list.

8. A non-transitory computer readable medium for optimizing bandwidth in a mesh system, comprising computer readable code executable by one or more processors to:
   initiate, at a bandwidth optimization module, a peer-to-peer conference with a plurality of remote devices, wherein a first device is assigned to a first quality list and a second device is assigned to a second quality list, wherein the first quality list indicates a first quality level and wherein the second quality list indicates a second quality level;
   determine, during the peer-to-peer conference, that the second device satisfies conditions to be a member of the first quality list;
   determine that a maximum number of members of the first quality list has been reached;
   in response to determining that a maximum number of members of the first quality list has been reached, select the first device to be removed from the first quality list based on characteristics of the first device, wherein the members of the first quality list are listed in order of preference, and wherein the characteristics indicate that the first device is least preferable based on the order of preference of the first quality list;
   remove the first device from the first quality list;
   add the second device to the first quality list; and
   transmit a request to the second device to receive a data stream at the first quality level.

9. The computer readable medium of claim 8, wherein the conditions to be a member of the first quality list comprise determining that the second device is associated with a currently active audio stream.

10. The computer readable medium of claim 8, wherein the conditions to be a member of the first quality list comprise receiving user input directing the second device to be added to the first quality list.

11. The computer readable medium of claim 8, wherein selecting the first device to be removed is further based on characteristics of additional members of the first quality list.

12. The computer readable medium of claim 8, wherein the characteristics of the first device comprise a measure of inactivity of the first device.

13. The computer readable medium of claim 8, wherein the characteristics of the first device comprise a comparable preference value of the first device among members of the first quality list.

14. The computer readable medium of claim 8, wherein the characteristics of the first device comprise a received user input indicating that the first device should be removed from the first quality list.

15. A system for optimizing bandwidth in a mesh system, comprising:
   one or more processors;
   one or more memory devices coupled to the one or more processors and comprising computer readable code executable by the one or more processors to:
   initiate, at a bandwidth optimization module, a peer-to-peer conference with a plurality of remote devices, wherein a first device is assigned to a first quality list and a second device is assigned to a second quality list, wherein the first quality list indicates a first quality level and wherein the second quality list indicates a second quality level;
   determine, during the peer-to-peer conference, that the second device satisfies conditions to be a member of the first quality list;
   determine that a maximum number of members of the first quality list has been reached;
   in response to determining that a maximum number of members of the first quality list has been reached, select the first device to be removed from the first quality list based on characteristics of the first device, wherein the members of the first quality list are listed in order of preference, and wherein the characteristics indicate that the first device is least preferable based on the order of preference of the first quality list;
   remove the first device from the first quality list;
   add the second device to the first quality list; and
   transmit a request to the second device to receive a data stream at the first quality level.

16. The system of claim 15, wherein the conditions to be a member of the first quality list comprise determining that the second device is associated with a currently active audio stream.

17. The system of claim 15, wherein the conditions to be a member of the first quality list comprise receiving user input directing the second device to be added to the first quality list.

18. The system of claim 15, wherein selecting the first device to be removed is further based on characteristics of additional members of the first quality list.

19. The system of claim 15, wherein the characteristics of the first device comprise a measure of inactivity of the first device.

20. The system of claim 15, wherein the characteristics of the first device comprise a comparable preference value of the first device among members of the first quality list.

* * * * *